Feb. 2, 1960 C. B. VOGEL 2,923,915
GEOPHYSICAL HYDROPHONE
Filed Dec. 1, 1955 2 Sheets-Sheet 1

INVENTOR:
CHARLES B. VOGEL
BY:
HIS ATTORNEY

Feb. 2, 1960   C. B. VOGEL   2,923,915
GEOPHYSICAL HYDROPHONE

Filed Dec. 1, 1955   2 Sheets-Sheet 2

INVENTOR:
CHARLES B. VOGEL
BY
HIS ATTORNEY

United States Patent Office 2,923,915
Patented Feb. 2, 1960

2,923,915

GEOPHYSICAL HYDROPHONE

Charles B. Vogel, Houston, Tex., assignor to Shell Development Company, New York, N.Y., a corporation of Delaware Application December 1, 1955, Serial No. 550,354

7 Claims. (Cl. 340—17)

This invention pertains to seismic hydrophones and detectors, and relates more particularly to a hydrophone comprising a variable reluctance detector of special construction, and to a cable or streamer carrying a plurality of such detectors for use in underwater geophysical work, e.g., in offshore seismic exploration, in the determination of seismic velocities, in acoustical well logging, and the like.

Detectors used for the reception of seismic or acoustic impulses in submerged areas or in wells having a liquid column standing therein are usually of the seismometer, or velocity-wave responsive type, or of the pressure-wave responsive type. A plurality of such detectors can be attached to or incorporated in a cable or streamer for the purpose of measuring vertical seismic velocities in wells, or for carrying offshore seismic exploration work.

Devices of the above-mentioned types have certain drawbacks. Detectors of the velocity responsive type, when used in wells for vertical velocity determinations or for acoustic logging, are sensitive not only to energy traveling through the liquid, but also to that traveling along the cable. If the velocity of propagation is higher in the cable than in the surrounding medium, it is usually not possible to determine accurately the time at which the true seismic wave arrives at a given depth, this being obscured by the earlier arrival of the cable vibrations. The same is true to a certain extent of pressure-responsive detectors, especially when the latter comprise a piezo-electric element which may come in contact with the wall of a borehole. The sensitivity of piezo-electric elements of certain types is moreover unfavorably affected by high temperatures prevailing in wells. Streamer cables carrying a plurality of hydrophones are usually of a very complex and costly construction, requiring the cable to be broken at each detector to effect a connection with the cable conductors. Moreover, piezo-electric detectors are relatively fragile and require the use of high impedance electrical circuits. On the other hand, conventional magnetostrictive and variable reluctance detectors have been of relatively complicated or expensive construction; furthermore, their design has often been such that they were easily damaged by the sudden application of large static pressure. Pressure equalization in variable reluctance detectors has been accomplished in the past by methods which make the detector relatively insensitive to low frequency velocity excitation. This is undesirable where the detector is attached to a cable.

It is therefore an object of this invention to provide a hydrophone comprising a variable reluctance seismic detector free of the drawbacks mentioned above. For purposes of uniform terminology, the term "hydrophone" will be applied hereinbelow to a whole pressure-sensitive unit enclosed in a housing and connected to a conductor cable, while the term "detector" will be applied to the particular unit within the hydrophone which actually translates pressure pulses into electrical signals.

It is particularly an object of this invention to provide a hydrophone having a variable reluctance detector element, which hydrophone is adapted to be clamped on the cable and electrically connected thereto without requiring the cable to be broken at this point to effect the attaching and sealing of the hydrophone.

It is further an objective of this invention to provide a hydrophone wherein said variable reluctance detector element is of simple and sturdy design with only one moving part.

It is also an objective of this invention to provide a hydrophone with a pressure equalization system which will accommodate rapid changes in static pressure without decreasing low frequency response to pressure waves and without increasing undesirable low frequency response to velocity excitation.

It is also an object of this invention to provide a hydrophone having a guard member protecting its pressure responsive variable reluctance element from forces impressed thereon by the bending or twisting of the cable during operations, or by contact with outside objects.

It is also an object of this invention to provide a geophysical cable or streamer having a plurality of hydrophones of the above type connected thereto.

These and other objects of this invention will be understood from the following description taken with reference to the attached drawings, wherein:

Figure 1 is a diagrammatic view of the cable or streamer embodying the present invention;

Figures 2a, 2b, 2c and 2d give an exploded view of the hydrophone of the present invention showing in detail the structure of the housing thereof;

Figures 1, 2A, 2B, 2C, 2D:
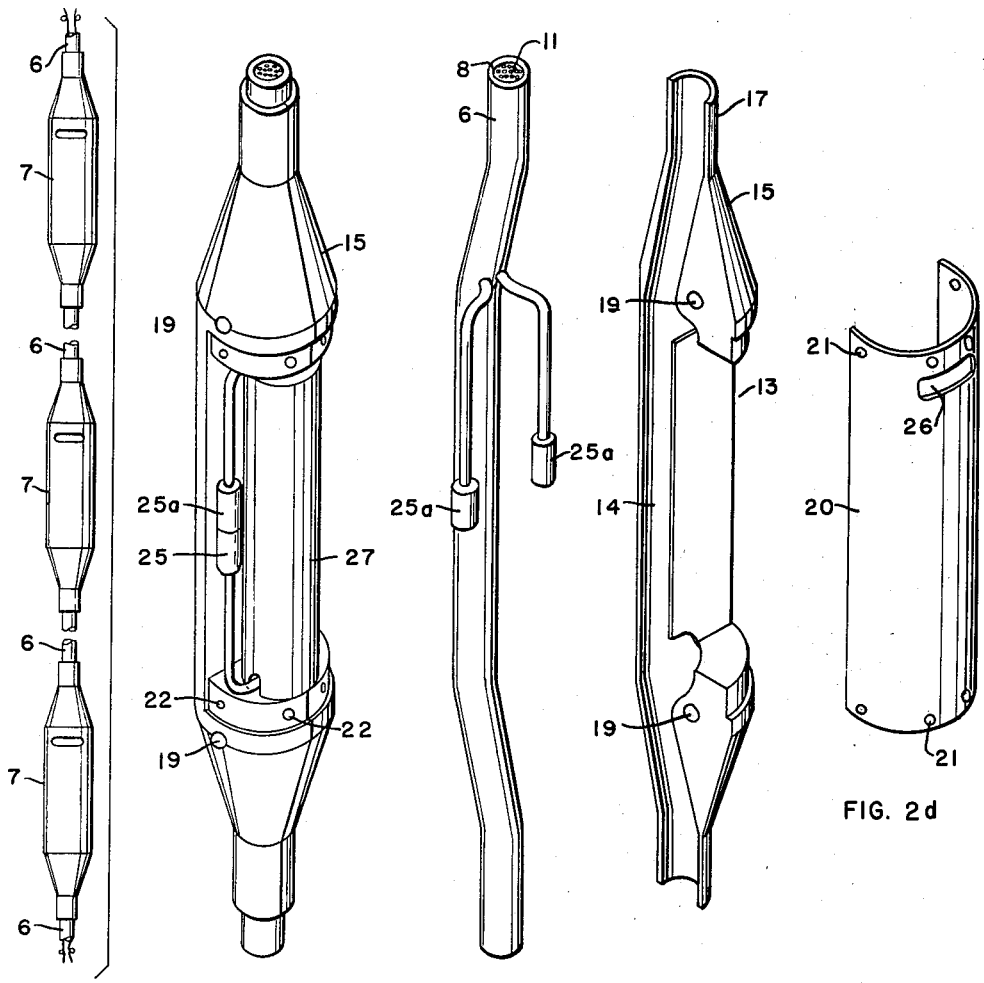

As shown in Fig. 1, the present geophysical cable or streamer comprises a cable element 6 of any desired length, provided with a plurality of hydrophones generally indicated at 7 and connected thereto in a manner described hereinbelow. The hydrophones 7 are carried by the cable at suitable spacings from each other, such as 20 feet in well logging work, or 5 to 300 feet in offshore seismic exploration. The number of hydrophones carried by the cable 6 may vary between very wide limits, such as from 3 to 200.

As more particularly shown in Fig. 2b, the cable 6 is made of a suitable rubber composition or sheath 8 and carries imbedded therein a plurality of insulated electrical conductors 11, the number of said conductors being sufficient to permit all the hydrophones carried by the cable to be suitably connected thereto. Besides the conductors 11, the cable 6 may be provided with reinforcing longitudinal stress members or steel cables, and with longitudinal spaces or cavities adapted to be filled with oil to give the cable a desired buoyancy as described, for example, in U.S. Letters Patent 2,465,696 to Paslay. These features do not however form a part of this invention, and are not shown in Figure 2.

Each hydrophone 7 comprises two similar clamping guard or housing members 13, one of which is shown in Fig. 2c, clamped on the cable 6 in the manner shown in Fig. 2a and having outwardly directed faces 15 of a generally conical shape for streamlining purposes. The members 13 are made of a suitable material, such as aluminum, steel, copper or a plastic, and have axial end portions 17 of reduced diameter. Each of the members 13 has a channel 14 extending longitudinally thereof and offset to one side as more clearly shown in Fig. 3. When two matching members 13 are clamped together, the channels 14 therein serve to receive the cable. The offset position of the cable provides for more space for the detector inside the hydrophone, and also, by bending the cable to the shape of the channel, permits the hydrophone to remain strongly anchored on the cable without sliding thereon even in case of clamp failure. After the hydrophones 7 have been assembled on the cable 6, they may further be securely anchored thereto by passing screws through openings 19 and tightening the screws, thereby securing together the two similar clamping guard members 13.

The clamping guard members 13 have a semi-cylindrical cover-plate 20 attachable by screws passed through openings 21 and 22. Behind this cover-plate 20 the detector 27 is loosely mounted and is readily accessible for repair by removing the cover-plate 20. The cover-plate 20 has an opening 26 to transmit pressure from the sea or from well fluid to the detector element.

The clamping guard members 13 and the attached semi-cylindrical cover-plate 20 form a housing that is coaxial with the cable, even through the detector 27 is not. The cable 6 is securely held in the channel 14 of circular cross-section, the mid-portion of which is off-center. The cable 6 thus passes longitudinally alongside of the detector 27. The housing protects the detector 27 and cable splice 25, and is easily disassembled for replacement of a detector which may become defective or for repair of a faulty conductor cable splice.

Figure 3:
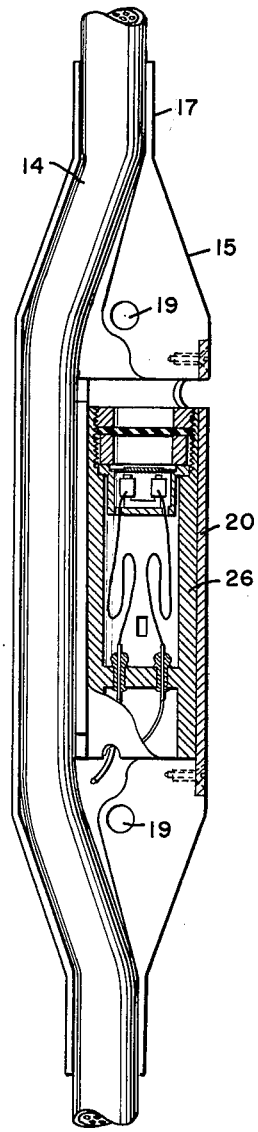
Figure 3 is a cross-section view of the present hydrophone.
Figure 4:
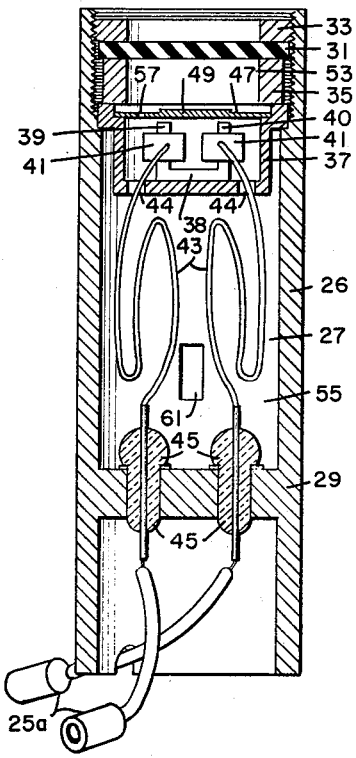
Figure 4 is a cross-section view of the variable reluctance detector element of the present hydrophone.

The present variable reluctance detector 27 is diagrammatically shown in Figs. 3 and 4 as inserted into the housing formed by the two guard members 15. The detector 27 comprises a generally cylindrical hollow case 26 closed near one end by a transverse partition 29, welded or soldered thereto, or formed integrally with the case 26, as shown in the drawing. The case 26 may have a length of about two inches and a diameter of about three-quarters of an inch. The case 26 is closed near its other end by a second partition 31, held between two retainer rings 33 and 35, screwed into the case 26. The partition 31 may be made of any suitable resilient material, such as rubber, and particularly synthetic rubber. The outer face of diaphragm 31 is in contact with well fluids, sea water or any other liquids in which the hydrophone may be immersed, the function of diaphragm 31 being to protect the inner elements of the detector from direct contact with said liquids while transmitting desired pressure variations. Held between the retainer ring 35 and a shoulder formed on the internal wall of case 26 is a cage 37 coaxial with the case 26. Suitably held within the cage 37 is a magnet structure comprising a magnetic yoke 38 preferably having two permanently magnetized pole pieces 39 and 40, which have pick-up coils 41 wound thereon, said coils comprising a large number of turns of fine insulated wire. The ends of the coils 41 are connected to suitable insulated leads 43, which are led through openings 44 of the cage 37 and through packing glands 45, and are then connected to the splices 25a which are adapted to connect with similar splices 25 of the cable 6, as shown in Fig. 2a.

Freely supported at its outer edge between ring 35 and cage 37 is a thin, flexible, circular diaphragm 47, coaxial with case 27 and cage 37. The diaphragm 47, made of a magnetic material, serves as an armature to the magnet 38 and preferably has a somewhat thickened central circular portion 49. The support for the diaphragm is arranged so that when the edge of the diaphragm is in contact with cage 37, the central portion 49 lies close to, but not in contact with the pole pieces of magnet 38, and when the edge of the diaphragm is in contact with ring 35, the central portion of the diaphragm remains within the field of attraction of magnet 38 while the space between the edge of the diaphragm and cage 37 provides a passageway allowing fluid to flow around the edge of the diaphragm. As will be apparent to those skilled in the art, a more rapid flow of fluid can be provided for by notching or perforating the edge of diaphragm 47, beyond the portion arrange to contact cage 37, by grooving the portion of ring 35 adjacent to the edge of diaphragm 47, or the like.

The space 53 between the rubber diaphragm 31 and the magnetic diaphragm 47, as well as space 55 between the diaphragm 47 and the partition 29, is filled with a fluid such as a synthetic oil, for example, a silicone oil, or any suitable refined hydrocarbon oil.

The diaphragm 47 is perforated by a small hole 57, which serves as a pressure-equalizing port between the spaces 53 and 55 on the two sides of said diaphragm. This port permits a slow flow of fluid which relieves slow pressure changes, such as those encountered as the instrument is lowered into a borehole, but will not permit a rapid flow that would relieve the more rapid pressure variations accompanying a seismic wave. Thus, these rapid pressure variations cause a flexing motion of the diaphragm 47 and corresponding variations of magnetic flux in the gap between said diaphragm and permanent magnet pole pieces 39 and 40. The flux variations induce voltages in the pickup coils 41, and these are transmitted to the surface as signals through the cable 6.

In the cavity 55 back of the magnetic diaphragm 47 may be inserted what, for the purposes of this invention, will be termed a sealed resilient air pocket. This sealed air pocket may take the form of a piece of cork or of any porous material capable of retaining air in its pores. Preferably, however, the sealed air pocket is formed as a free floating piece of thin-walled rubber tubing 61, having dimensions such as ¼ inch O.D., 1 inch long, air-filled and sealed at each end. The air pocket thus formed increases the compliance of the volume behind the magnetic diaphragm 47, and increases the detector sensitivity by a factor of about 100 at pressures less than 50 p.s.i. At greater depths, where pressure may exceed 1000 p.s.i., the air pocket of dimensions such as indicated above becomes small and less compressible and has less effect on detector sensitivity. However, by making the oil volume and rubber tubing volume larger, a substantial improvement in sensitivity can be made effective at any desired pressure higher than 50 p.s.i.

Two features are to be especially noted concerning the present variable reluctance detector. First, the magnetic diaphragm 47 is not rigidly attached at its edges, but is held in position by the force of the permanent magnet 38. The diaphragm 47 is not completely free since it is restrained within certain limits by the cage 37 and ring 35 near its periphery. Thus, if the static pressure is suddenly diminished, the diaphragm 47 is free to move outward a small distance, allowing fluid leakage around its edge and thus accomplishing rapid pressure equalization. On the other hand, if static pressure is suddenly increased, the diaphragm edge is not free to move, but the center of the diaphragm (which under these conditions is subject to considerable pressure) is supported by the centrally located pole pieces 39 and 40. This makes it possible to use a leakage port 57 small enough to provide for a long time constant and thus a good low frequency response. When the pressures in space 53 and cavity 55 are about equal, the force of magnet 38 holds the diaphragm in its operating position with its edges in contact with cage 37 and its central portion 49 close to but not in contact with pole pieces 39 and 40.

The second feature of the present detector is that static and dynamic pressures are applied to the same side of the sensitive magnetic diaphragm 47. This is much more desirable than a system in which static pressure equalization is accomplished through a leakage port at the opposite end of the compliant oil-filled cavity. In the latter case, if a large port is used to allow rapid equalization, the device becomes sensitive to vibrations in a direction normal to the diaphragm.

The present variable reluctance detectors have the following advantages over piezo-electric elements: they have a high sensitivity and relativity lower internal impedance; they have a large mechanical coefficient of coupling and are thus very efficient; they are relatively insensitive to temperature changes and are not permanently damaged by moisture.

In particular, any desired number of the present detectors, such as up to 40 or more, may be strung on a cable and towed behind a recorder boat while charges of dynamite are exploded at suitable distances and depths for seismic exploration purposes.

Likewise one, two or more of these detectors may be lowered on a cable into a well or borehole for purposes of seismic velocity determination or seismic or acoustic logging of the formations traversed by the borehole. In such cases, the explosions or pulses to be recorded may be generated either at the surface, within or adjacent the well, or relatively close to said detectors, for example, by means of a pulse source lowered into the well together with the detectors, as described in my Patent No. 2,651,027 or my copending application Serial No. 284,867, filed April 29, 1952, issued on May 17, 1955 as U.S. Patent No. 2,708,485. Other uses of the present detectors will occur to those skilled in the art.

It will be appreciated that the rigid housing 13 forms an essential feature or element of the present invention, since it prevents the cable, on twisting or bending during use, from applying mechanical forces to the detector, thereby creating spurious electric signals. Further protection against spurious electric signals is provided by the semi-cylindrical cover-plate 20 which guards the detector 27 against shocks and contact with obstacles. In particular, it is desirable to keep the detector element out of contact with the walls of a borehole during well logging operations since, when such contact occurs, vibrations traveling along the cable cause forces to be applied to the sensitive diaphragm, and spurious voltages to be produced by the latter.

I claim as my invention:

1. A hydrophone adapted to be clamped to a conductor cable for operation in a submerging fluid, a detector within said hydrophone having a chamber filled with an insulating liquid, a resilient diaphragm or magnetic material dividing said chamber into two compartments, one of said compartments being separated from the submerging fluid by a flexible partition, leakage means for said insulating liquid provided in the plane of said magnetic diaphragm to equalize static pressures across said diaphragm, and a resilient air pocket sealed in that compartment of the chamber which is not in contact with the submerging fluid through a flexible partition.

2. A hydrophone adapted to be attached to a conductor cable for operation in a submerging fluid, a detector within said hydrophone having a chamber filled with an insulating liquid, a resilient diaphragm of magnetic material dividing said chamber into two compartments, a flexible partition separating one of said compartments from the submerging fluid, means for equalizing static fluid pressure differences between the two compartments comprising conduit means in fluid communication between the two compartments, and a resilient air pocket sealed in that compartment of the chamber which is not in contact with the submerging fluid through a resilient partition.

3. A hydrophone adapted to be attached to a conductor cable for operation in a submerging fluid, a detector within stid hydrophone having a chamber filled with an insulating liquid, a resilient diaphragm of magnetic material dividing said chamber into two compartments, a flexible partition separating one of said compartments from the submerging fluid, and a resilient air pocket sealed in that compartment of the chamber which is not in contact with the submerging fluid through a resilient partition.

4. A hydrophone adapted to be attached to a conductor cable for operation in a submerging fluid, a detector within said hydrophone having a chamber filled with an insulating liquid, resilient diaphragm means of magnetic material dividing said chamber into two compartments, one of said compartments being separated from the submerging fluid by a flexible partition, means for equalizing static fluid pressure differences between the two compartments, magnetic yoke means having pole pieces nearly in contact with said resilient diaphragm, a winding on said yoke means electrically connectable to the cable supporting the hydrophone, whereby electromotive forces generated in said winding by pressure-responsive resilient diaphragm fluctuation are transmitted along the cable, and a resilient air pocket sealed in that compartment of the chamber which is not in contact with the submerging fluid through a resilient partition.

5. In combination with a conductor cable, a hydrophone unit comprising a solid housing adapted to be clamped about said cable, said housing comprising two separate halves symmetrical with regard to a plane passing through the axis of said cable, a groove formed in each half of said solid housing, said grooves registering with each other to form a channel way encompassing the cable when the halves are clamped together about the cable, said channel way passing axially of the housing at the end portions thereof and being offset to one side within the central part thereof, space being thereby provided to receive a pressure-responsive detector therein, connecting means carried by said detector and said cable for electrically connecting said detector to said cable, and shield means adapted to be clamped to said housing about said detector, said hydrophone unit thus forming an elongated member having a cylindrical portion in the middle and a conical portion at each end.

6. A hydrophone disposed to be clamped to a conductor cable for operation in a submerging fluid comprising: a solid housing disposed to be clamped about the cable, said housing being formed from two halves symmetrical with regard to a plane passing through axis of the cable; a groove formed in each half of said housing, said grooves registering with each other to form a channel way encompassing the cable when the halves are clamped together about the cable; said channel way passing axially of the housing at the end portions thereof, and being offset to one side within the central part thereof, space being thereby provided to receive a pressure-responsive detector therein; connecting means carried by said detector and the cable for electrically connecting said detector to the cable; said detector having a chamber filled with an insulating liquid, a resilient diaphragm of magnetic material dividing said chamber into two compartments, a flexible partition separating one of said compartments from the submerging fluid, means for equilizing the static fluid pressure differences between the two compartments including conduit means for providing fluid communication between the two compartments, a resilient air pocket sealed in that compartment of the chamber which is not in contact with the submerging fluid through the resilient partition, and shield means adapted to be clamped to said housing about said detector.

7. A hydrophone adapted to be attached to a conductor cable for operation in a submerging fluid, a detector within said hydrophone having a chamber filled with an insulating liquid, a resilient diaphragm of magnetic material dividing said chamber into two compartments, a flexible partition separating one of said compartments from the submerging fluid, magnetic yoke means having pole pieces nearly in contact with said resilient diaphragm, a winding on said yoke means electrically connectable to the cable supporting the hydrophone, whereby electromotive forces generated in said winding by pressure-responsive resilient diaphragm fluctuation are transmitted along the cable, and said resilient diaphragm having a thickened central portion, whereby when the diaphragm is deflected into contact with the said magnetic yoke means in response to large increases in the static pressure of the submerging fluid, the thickened portion of the diaphragm contacts the pole pieces of the yoke means and permanent deformations of the diaphragm are avoided.

References Cited in the file of this patent

UNITED STATES PATENTS

| | | |
|---|---|---|
| 1,624,412 | Horton | Apr. 12, 1927 |
| 1,667,418 | Hahnemann | Apr. 24, 1928 |
| 2,405,226 | Mason | Aug. 6, 1946 |
| 2,406,767 | Hayes | Sept. 3, 1946 |
| 2,410,806 | Black | Nov. 12, 1946 |
| 2,434,900 | Black | Jan. 27, 1948 |
| 2,478,517 | Winterhalter | Aug. 9, 1949 |
| 2,652,550 | Lash | Sept. 15, 1953 |
| 2,677,270 | Sanderson | May 4, 1954 |